(No Model.)
J. C. DITTRICH & F. M. GRUMBACHER.
STILL.
No. 487,027.  Patented Nov. 29, 1892.
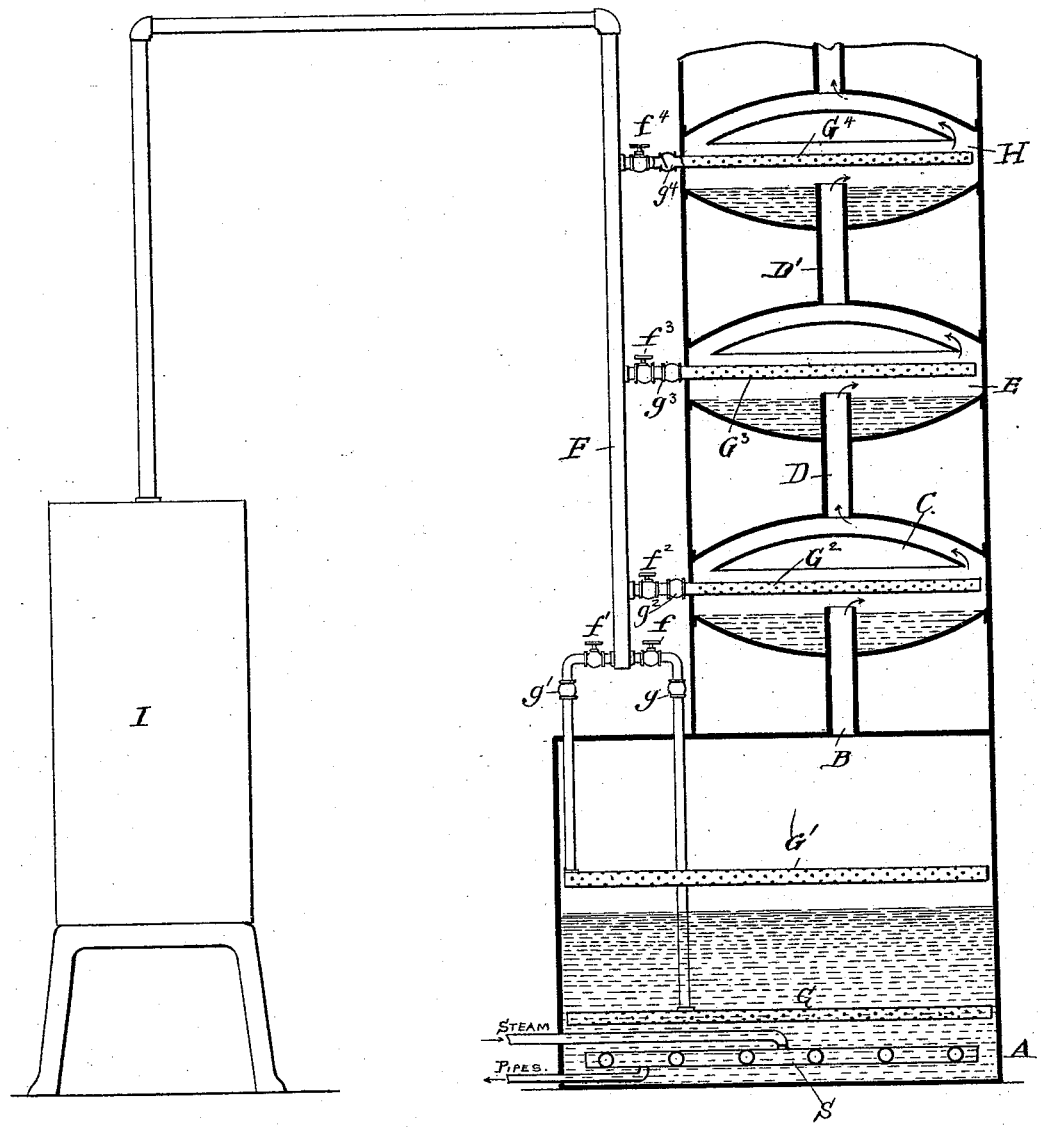
Witnesses
Norris A. Clark.
L. H. Latimer.
Julius Carl Dittrich & Frederick Maurice Grumbacher.
Inventors.
By their Attorney
Eaton Lewis.

UNITED STATES PATENT OFFICE.

JULIUS CARL DITTRICH AND FREDERICK M. GRUMBACHER, OF NEW YORK, N. Y., ASSIGNORS TO THE OZONE MANUFACTURING COMPANY, OF NEW JERSEY.

STILL.

SPECIFICATION forming part of Letters Patent No. 487,027, dated November 29, 1892.

Application filed November 12, 1891. Serial No. 411,739. (No model.)

*To all whom it may concern:*

Be it known that we, JULIUS CARL DITTRICH and FREDERICK MAURICE GRUMBACHER, both residents of the city, county, and State of New York, have invented certain new and useful Improvements in Stills, of which the following is a specification.

Our invention relates to the various forms of stills in general use; and it consists, among other things, in arranging in combination therewith a general feed-pipe having projecting therefrom one or more perforated branches preferably supplied with suitable stop-cocks and check-valves, said branches projecting into the condensation-chambers of the still.

The object of our invention is to form a still which shall permit gases, vapors, or liquids to be admitted to all or any part of the same under control of the attendant during the process of distillation, and for the purpose of combining with, acting upon, or modifying the condition of the liquid undergoing the process of distillation, and is particularly designed to admit ozone to the still as a part of a process which has been made the subject of another and distinct application, Serial No. 411,738, dated November 12, 1891.

In carrying out our invention we take any form of still, preferably that shown in part in the accompanying drawing, in which—

A is a reservoir or reception-chamber, and C, E, and H the several condensation-chambers, arranged one above another. The chamber A is provided with a coil of steam-pipes S for heating the liquid, or this chamber may be heated by any other suitable means. Within the chamber A are arranged two or more perforated branch pipes G G', placed so that some of them G may be beneath the surface of the liquid, while others G' are in the free space above it. This enables us to treat the liquid with gas before or after it is vaporized, or both, as desired. These branch pipes G G' are provided with check-valves $g$ $g'$ to control the back-pressure and stop-cocks $f f'$ to admit of regulating the ingress of the ozone or other gas, vapor, or liquid, said stop-cocks and check-valves being placed in the branch pipes near where they join with the main or feed pipe F F. From the latter also project branch pipes $G^2$ $G^3$ $G^4$, provided with stop-cocks $f^2$ $f^3$ $f^4$ and check-valves $g^2$ $g^3$ $g^4$ and having their perforated ends projecting into condensation-chambers C E H. The feed-pipe F is led back to a generator I, which may be an ozone-generator, for example, like that described in the patent to F. M. Grumbacher, No. 470,425, dated March 8, 1892, from which it conducts the ozone, gas, or other substance to be admitted to the still.

We are aware of the patent to Cole, No. 182,169, and do not claim the arrangement of apparatus therein shown.

Having described our invention, what we claim is—

1. The combination of a gas reservoir or generator, a still, condensers therefor with pipes or passages between the still and the condensers, and pipes extending into the condensers and having perforations or openings therein for allowing gas to escape into the condensation-chambers and to intermingle with the vapor therein, said pipes communicating with said reservoir or generator, substantially as described.

2. The combination of a still, means for heating the same, condensation-chambers communicating with the still, a feed-pipe, and branches extending therefrom into the condensation-chambers and having perforations or openings therein for allowing gas to escape into said chambers, substantially as described.

3. The combination of a still, means for heating the same, condensation-chambers communicating with the still, a general feed-pipe, and perforated branches extending from said feed-pipe into the still and into each chamber, substantially as described.

4. The combination of a still and means for heating the same, several condensation-chambers, one above another, an ozone reservoir or generator, and perforated pipes communicating with said reservoir or generator and extending into each chamber for conducting ozone into said chambers, substantially as described.

5. The combination of a still, condensation-chambers connected therewith, a feed-pipe extending from a suitable reservoir or generator, branch pipes extending from the feed-pipe into the still at different levels, whereby a pipe will be below the level of the liquid in the still and another pipe will be above the same, and branch pipes extending from the feed-pipe into the condensation-chambers, substantially as described.

6. The combination of an ozone-generator, a still, condensation-chambers, a feed-pipe between the generator and still, perforated branch pipes extending from the feed-pipe into the still and occupying different levels therein, perforated branch pipes $G^2$ $G^3$, extending from the feed-pipe into the condensation-chambers, and means for controlling the passage of gas through said pipes, substantially as described.

In testimony that we claim the foregoing as our invention we have signed our names, in presence of two witnesses, this 27th day of October, 1891.

JULIUS CARL DITTRICH. [L. S.]
F. M. GRUMBACHER. [L. S.]

Witnesses:
  HENRY D. HOBSON,
  L. H. LATIMER.